United States Patent Office 3,497,860
Patented Feb. 24, 1970

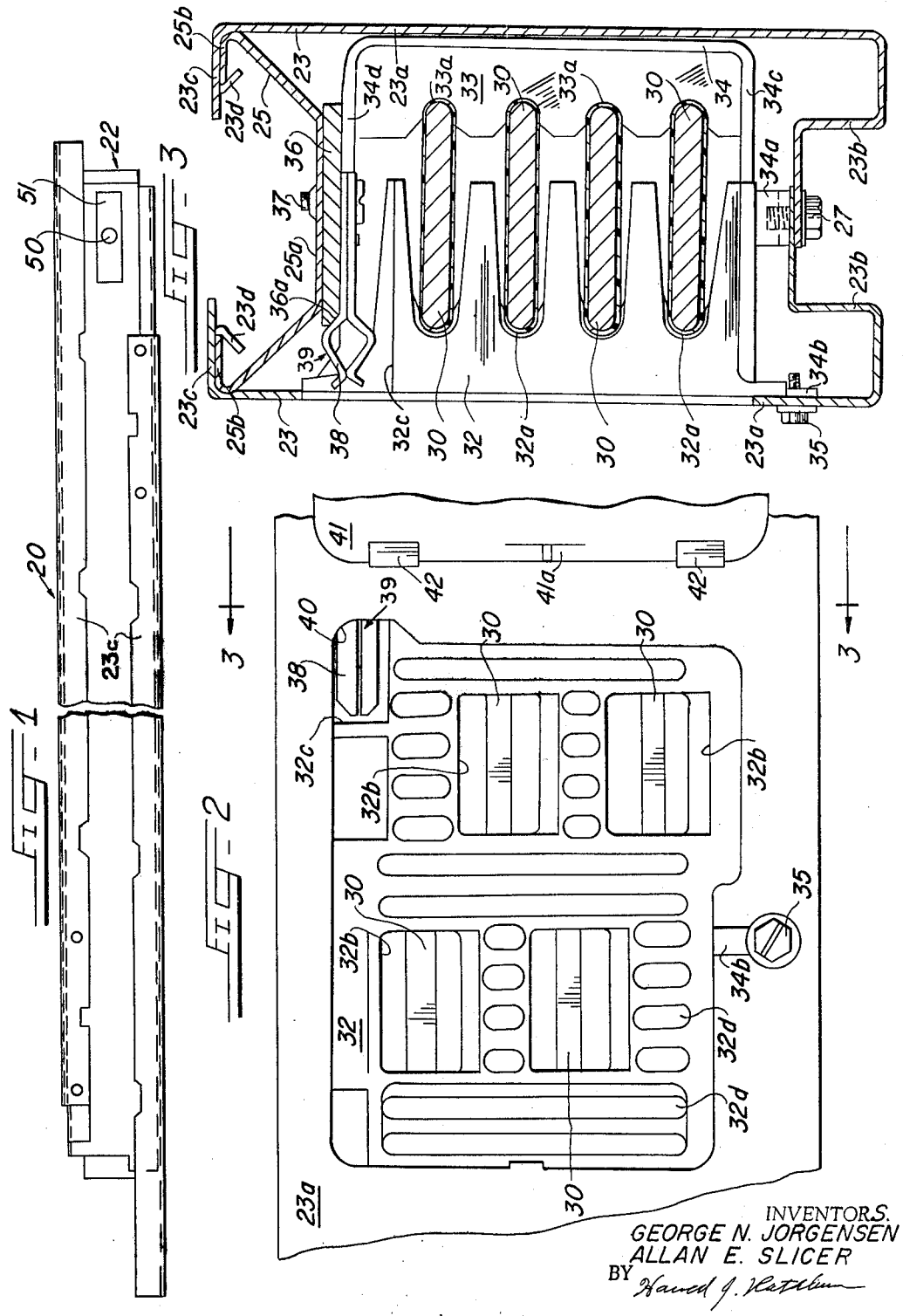

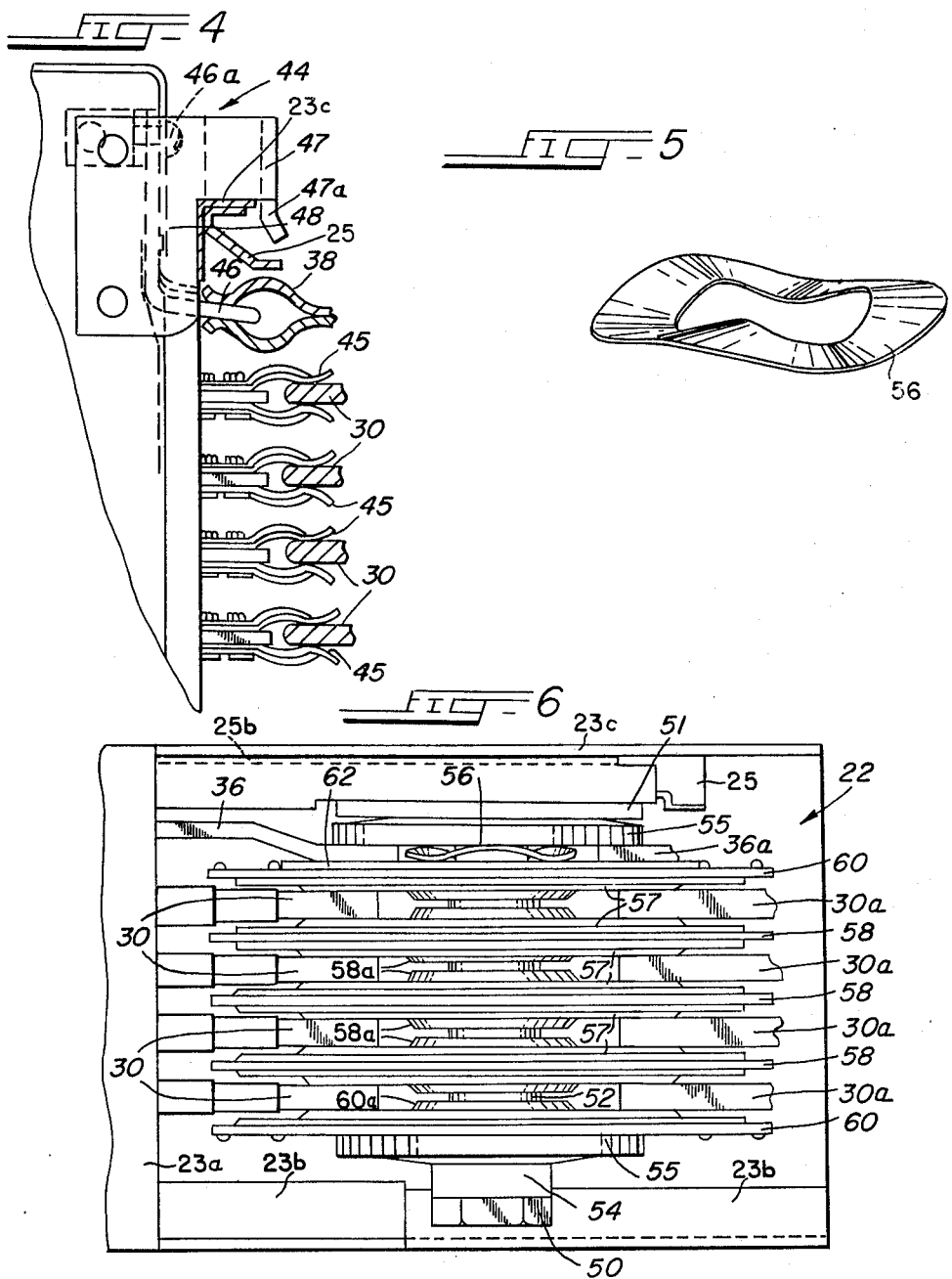

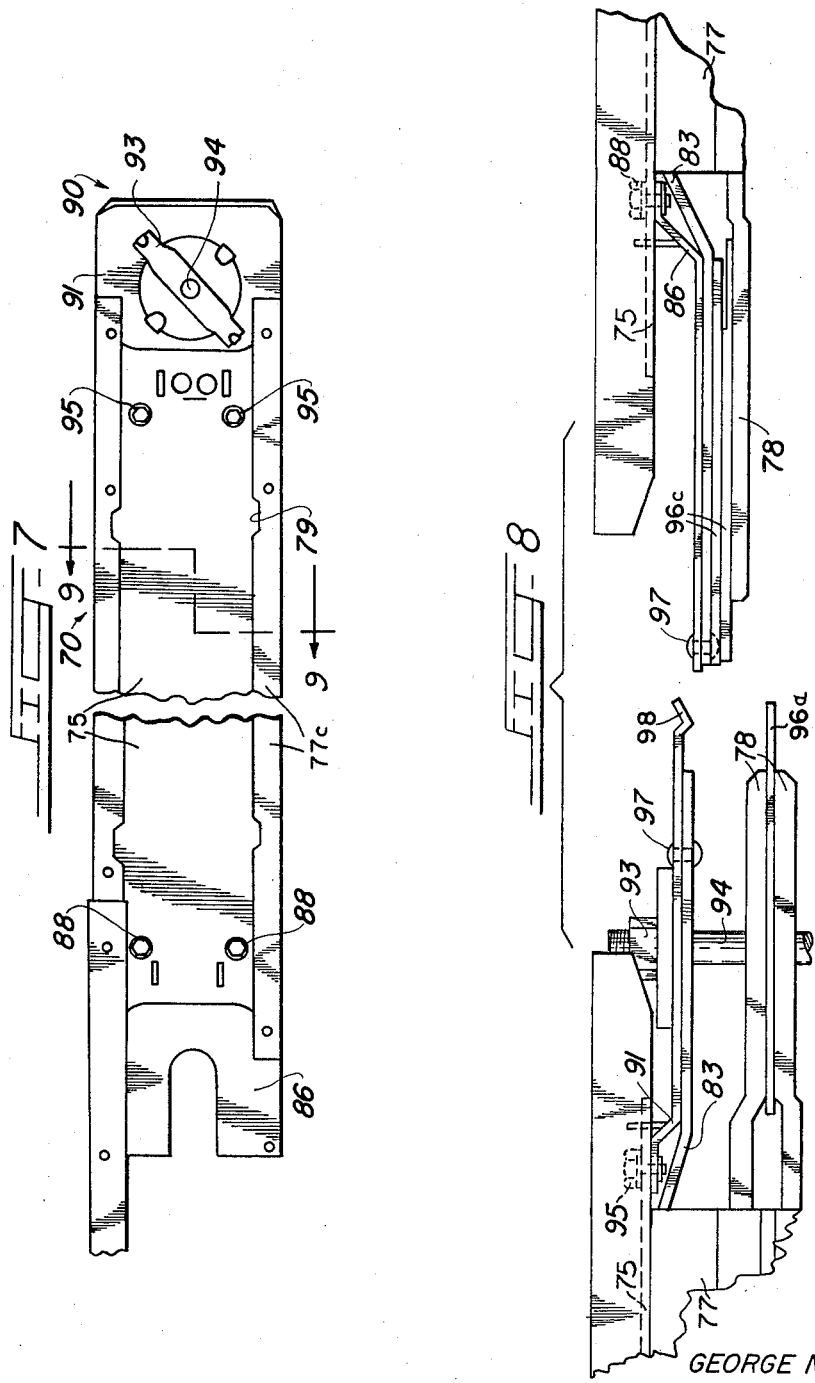

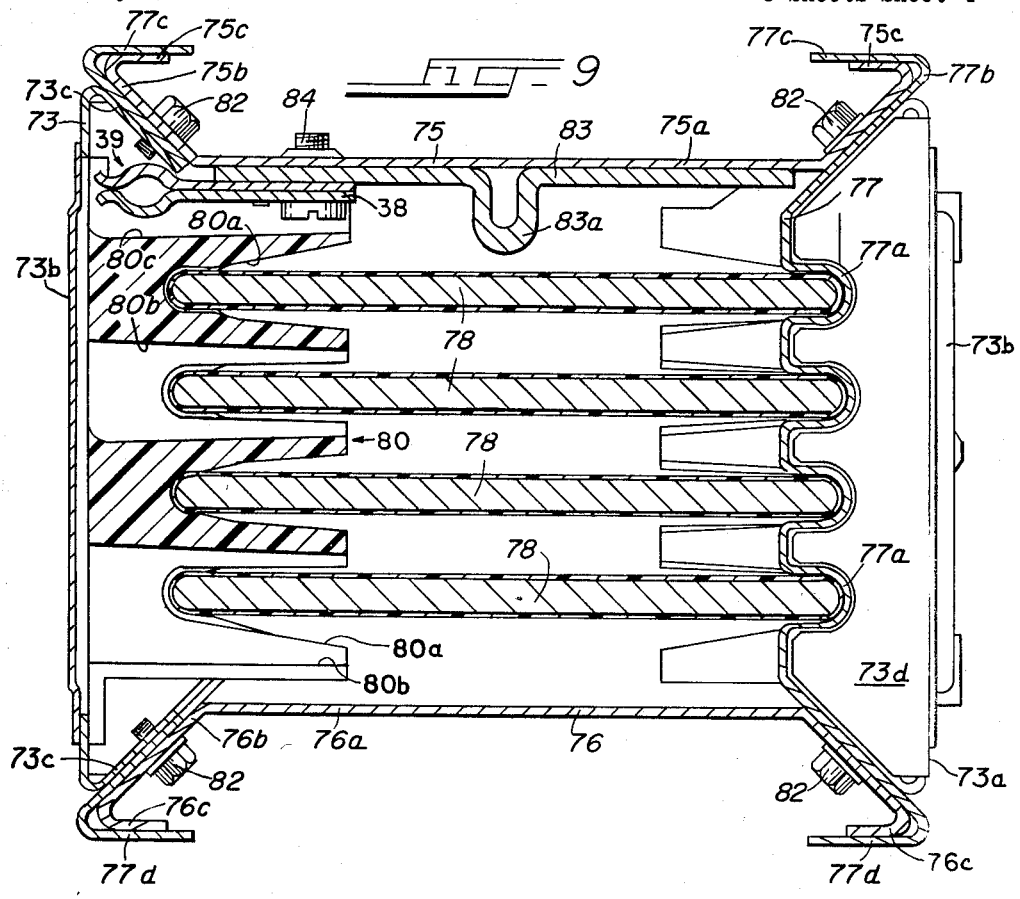
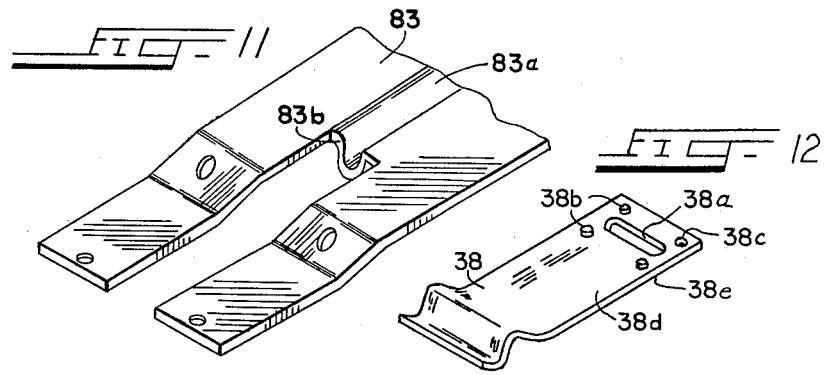

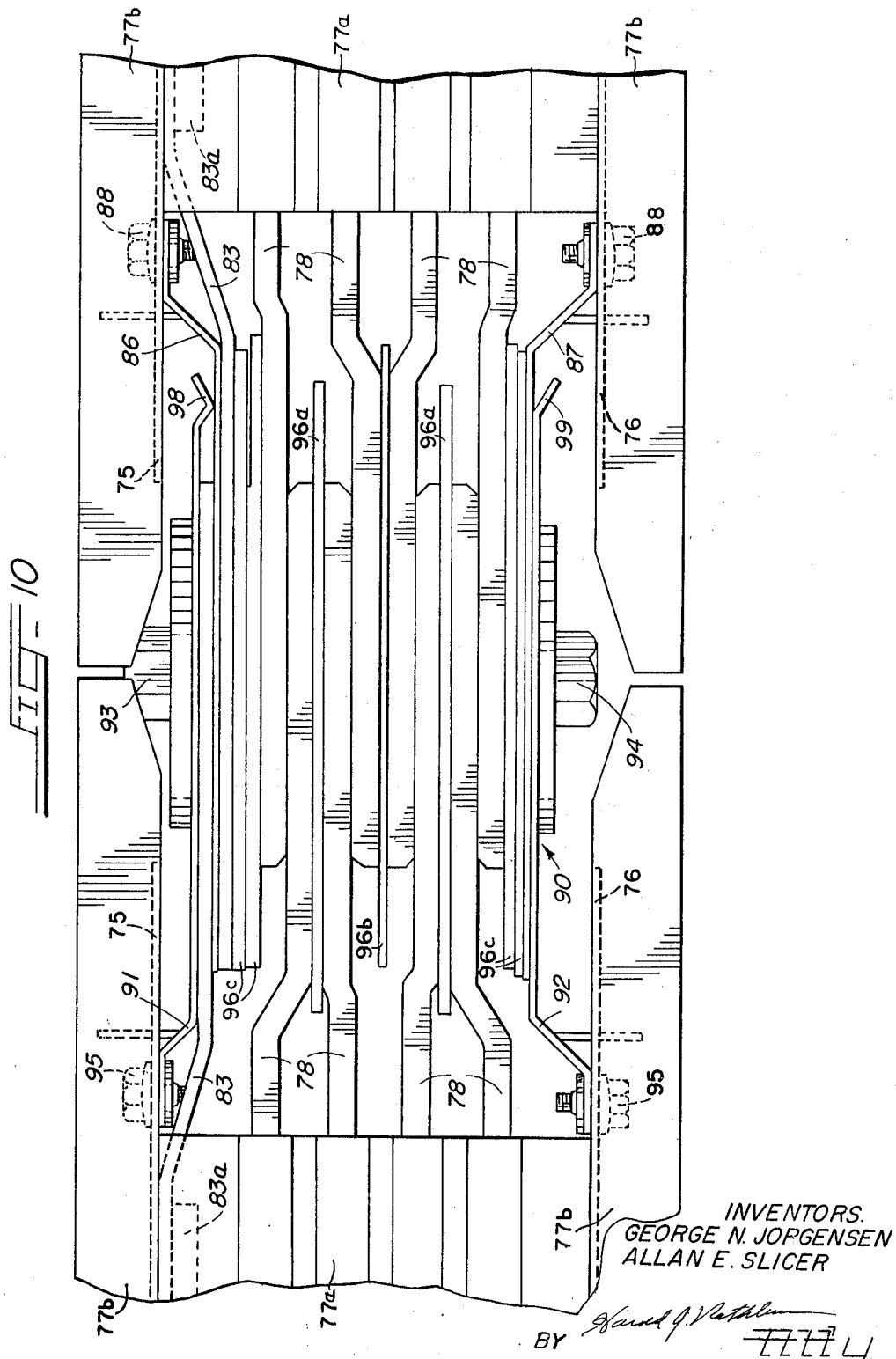

3,497,860
ELECTRICAL PLUG-IN BUS DUCT SECTION
HAVING A GROUND BUS BAR
George N. Jorgensen and Allan E. Slicer, Lexington, Ky., assignors to Square D Company, Park Ridge, Ill., a corporation of Michigan
Filed May 7, 1968, Ser. No. 727,275
Int. Cl. H01r 3/36
U.S. Cl. 339—14     26 Claims

ABSTRACT OF THE DISCLOSURE

The duct section has a plurality of flatwise-stacked parallel-spaced power bus bars and a ground bus bar. The ground bus bar is electrically connected to a duct housing and is mounted contiguous to a top wall thereof. The housing has recurring side openings on its opposite sides for connection of plug-in devices. Jaw connectors mounted on the ground bus bar are accessible at each opening for receiving a blade-type ground connector mounted on one of the plug-in devices. In one embodiment, the ground bus bar, although originally of the same width as the power bus bars, is formed with a longitunial rib making it narrower than the power bus bars.

---

This invention relates generally to plug-in bus duct, and more particularly to an improved plug-in bus duct section having an internal ground bus bar extending throughout the length of the section.

Prior feeder busways have been formed from serially-connected enclosed bus duct sections each comprising a plurality of flatwise-stacked bus bars one of which is a ground bus bar. Such feeder bus duct sections are described in detail in copending application Ser. No. 630,-110, filed Apr. 11, 1967, now Patent No. 3,446,911, issued May 27, 1969, and assigned to the assignee of the present invention. In the feeder bus duct section of that application, all of the bus bars are flatwise aligned with each other and with opposite walls of the housing, and the ground bus bar is disposed between one of the housing walls and one of the power bus bars. The ground bus bar extends into a joint structure at one end of the section for serial connection to a ground bus bar of a like section thereby to provide an electrically continuous ground bus running the entire length of a multi-section busway.

The addition of separate bus bars to feeder bus duct sections for grounding purposes contributed significantly to the busway art by providing a low impedance path to ground from a power bus bar inadvertently shorted to the housing or from a fault in equipment to which the run of feeder bus duct extended. Accordingly, the demands of the art required that a separate ground bus bar be provided in a busway to which power tap-off connections could be readily made at selected intervals along its length. Known plug-in bus duct sections have the necessary recurring access openings for power tap-off devices or plug-in units, but do not have the separate ground bus bar.

Plug-in bus duct sections having recurring side openings for receipt of power plug-in units but without ground bus bars are disclosed in copending application Ser. No. 519,095, filed Jan. 6, 1966, now Patent No. 3,-384,854, issued May 21, 1968, and in copending application Ser. No. 542,826, filed Apr. 15, 1966, now Patent No. 3,384,855, issued May 21, 1968, both patents being assigned to the assignee of the present invention. Each of these prior plug-in bus duct sections has a joint structure compatible with the joint structures of available feeder duct section, thus facilitating the interspersal of sections of plug-in bus duct with sections of feeder bus duct in a busway to provide access openings for plug-in units wherever load connections are required. The present invention provides a ground bus bar in a plug-in bus duct section which accepts plug-in units at recurring locations and has a joint structure compatible with the joint structure of a feeder duct section having a ground bus bar. This is accomplished by modifying the structures of the plug-in bus duct of the above-mentioned copending applications Ser. Nos. 519,095 and 542,826, to which reference may be made for a more detailed description of certain features of the present disclosure. The improvement involves the addition of a separate ground bus bar to the plurality of power bus bars already provided without significant modification of the duct housing.

A plug-in busway made up of serially-connected sections of bus duct in accordnce with this invention provides a low impedance path to ground in event of a short circuit between a power bus bar in any one of the bus duct sections and its housing, or in event of a short circuit between an electrical conductor and the grounded housing of the equipment connected to the plug-in bus duct at any one of a plurality of recurring access openings. This is accomplished by the addition of a separate bus bar, solely for grounding purposes, to each section of bus duct in a run of plug-in busway, the provision of joint structures ensuring low-impedance connections between the ground bus bars of serially-connected sections, and the connection of the ground bus bar of a terminal section to ground at a transformer or switchboard of an electrical power supply system. With such such a low impedance ground path, the duct housing and the equipment housings will remain at or very near ground potential even though a short circuit occurs anywhere along the busway or in the equipment supplied thereby.

Because the ground path impedance through the ground bus bars of bus duct sections in accordance with this invention is lower than that which would be realized by using only the housings of bus duct sections as a ground path, a larger ground current is drawn thus causing the opening of overcurrent protective devices more quickly and reducing the possibility of damage to equipment and injury to personnel.

In one form of plug-in bus duct section in accordance with this invention, an elongated three-piece housing of rectangular cross-section is provided including a top wall member and a pair of combination side and bottom wall members, the top wall member having a generally flat main portion, and the combination side and bottom wall members having a plurality of recurring side openings. A plurality of generally flat power bus bars of uniform cross-section are disposed in the housing in flatwise-stacked parallel-spaced relationship to each other and to the generally flat main top wall portion. At one end of the section, the power bus bars extend into a joint structure to facilitate serial connection of the section to another like bust duct section. A generally flat elongated ground bus bar of the same width but thinner than the power bus bars is mounted within the housing in engagement with the generally flat main portion of the top wall, is disposed in flatwise parallel-spaced relation to the power bus bars, and extends into the joint structure. The longitudinal edge portions of the respective power bus bars and the ground bus bar are exposed through the access provided by the recurring side openings for connection with an attachable plug-in unit having power connectors and a separate ground connector.

An alternative embodiment of a plug-in bus duct section in accordance with this invention comprises an elongated four-piece housing of rectangular cross-section, including a top wall member, a bottom wall member, and a pair of side wall members, the top wall member having a generally flat main portion, and the side wall members having a plurality of recurring side openings. The side wall members have oppositely corresponding inwardly-facing grooves, and a plurality of generally flat power bus bars are disposed in the housing in flatwise-stacked parallel-spaced relationship to each other and to the generally flat main portion of the top wall member, the opposite longitudinal edge portions of each power bus bar being supported in an opposing pair of the grooves. A joint structure is provided at one end of the section in which the power bus bars extend, and is arranged to facilitate serial connection of the section with another like bus duct section. A generally flat elongated ground bus bar, originally of the same width as the power bus bars but thinner with respect thereto, and formed with a longitudinal U-shaped channel or rib portion thereby to make it of lesser width than the power bus bars, is mounted within the housing in engagement with the main portion of the top wall member, is in flatwise parallel-spaced relationship to the power bus bars, and extends into the joint structure. The longitudinal edge portions of the respective power bus bars and the ground bus bar are exposed through the access provided by the recurring side openings for connection with an attachable plug-in unit having power connectors and a separate ground connector.

An object of this invention is to provide an improved plug-in bus duct section adapted to be serially connected to another bus duct section of like construction, the bus duct section including an elongated housing enclosing a plurality of power bus bars and a separate ground bus bar.

Another object is to provide an improved plug-in bus duct section in which a plurality of bus bars are arranged in flatwise-stacked parallel-spaced relationship to each other and to a housing wall, one of the bus bars being a ground bus bar disposed between the wall of the housing and an adjacent one of the other bus bars.

Another object is to provide a bus duct section such as in the preceding objects in which an end portion of the ground bus bar extends into a joint structure of the single-bolt type in the same manner as do the power bus bars so that, when a plurality of the duct sections are serially connected, end portions of the ground and power bus bars of one section are respectively connected through a low impedance connection to like bus bars of an adjacent section upon tightening of the single bolt.

Still another object is to provide a bus duct section such as in any of the preceding objects in which a longitudinal edge portion of the ground bus bar is accessible for a separate low impedance ground connection through recurring side openings spaced longitudinally of the housing of the bus duct section.

Further objects and advantages will become apparent from the following description wherein reference is made to the drawings, in which:

FIG. 1 is a top view of a section of plug-in bus duct constructed in accordance with the invention, an intermediate portion thereof being omitted;

FIG. 2 is a fragmentary enlarged side view of the bus duct section of FIG. 1 showing a plug-in opening with its door open;

FIG. 3 is a sectional view taken generally along the line 3—3 of FIG. 2;

FIG. 4 is a fragmentary side view of a plug-in unit having a blade-type ground connector and showing the manner in which a plug-in unit connects to the bus duct sections of FIG. 1 and FIG. 7;

FIG. 5 is a perspective view of a wave washer used in the joint structure of the bus duct section of FIG. 1;

FIG. 6 is an enlarged side view of a joint structure of the right-hand end portion of the bus duct section of FIG. 1 showing a left-hand end portion of a like connecting bus duct section in connected position;

FIG. 7 is a top view of an alternative embodiment of a bus duct section constructed in accordance with the invention, an intermediate portion being omitted;

FIG. 8 is a fragmentary side view of the right-hand end portion of the bus duct section of FIG. 7, showing the manner in which a ground bus bar extends into the joint structure, and a left-hand end portion of a like connecting bus duct section positioned for serial connection to the right-hand end portion;

FIG. 9 is a sectional view taken generally along the line 9—9 of FIG. 7;

FIG. 10 is an enlarged side view of a joint structure at the right-hand end portion of the bus duct section of FIG. 7 and showing a left-hand end portion of a like connecting bus duct section in connected position;

FIG. 11 is a perspective view of a left-hand end portion of a ground bus bar used in the alternative embodiment of FIG. 7; and FIG. 12 is a perspective view of a jaw member of a plug-in connector jaw used in both embodiments of the invention.

Referring to FIGS. 1, 2, and 3, a section of plug-in bus duct 20, constructed in accordance with the invention, includes a joint structure 22 at its right-hand end to facilitate the serial connection of the section 20 with another identical bus duct section. A housing of the section 20 comprises three elongated wall members, the housing being of the type disclosed in the above-mentioned Patent No. 3,384,854. A pair of combination side and bottom wall members 23 of the housing are identically formed, but are reversed end-to-end with respect to each other when assembled. The wall members 23 respectively have side wall portions 23a, inwardly-turned upper flanges 23c, and inwardly-stepped bottom wall portions 23b which, when the wall members 23 are assembled, define a groove in the bottom of the housing which complements the inwardly-turned flanges 23c at the top of the housing for cooperation with the mounting means of duct plugs or plug-in units such as disclosed, for example, in U.S. Patent No. 3,339,038, issued Aug. 29, 1967.

The third housing wall member 25 forms the top of the housing and is shaped to provide a generally flat main portion 25a between opposing slanting portions leading to a pair of inwardly-extending flanges 25b underlying the respective flanges 23c. The flanges 23c are notched at intervals as shown in FIG. 1 for positioning plug-in units longitudinally of the bus duct 20 in a manner to be described. Within each notch is an ear 23d which extends downwardly from the flanges 23c and which is bent outwardly under the respective flange 25b as shown in FIG. 3 to secure the top wall member 25 to the wall members 23. The wall members 23 are secured together at the bottom by a plurality of screws, such as a screw 27, spaced in a row longitudinally of the bus duct section 20. The screws 27 are threaded into brackets inside the housing as will be described.

The bus duct section 20, as shown most clearly in FIG. 3, has four insulated power bus bars 30 of uniform cross-section to provide a three-phase, four-wire electrical power supply system. For a three-phase, three-wire system the fourth power bus bar may be omitted. The power bus bars 30 are supported in flatwise-stacked parallel-spaced relationship at longitudinal intervals by a plurality of longitudinally-spaced bus bar support means, each comprising a main support 32 and a back-up support 33. The bus bar supports 32 and 33 are molded of insulating material and each has a plurality of inner recesses or notches 32a and 33a, respectively, opposite pairs of which are aligned when the supports are assembled and receive opposite longitudinal edge portions of the respective insulated power bus bars 30, the width of the bus bar supports 33 being much narrower than the width of the bus bar supports 32.

The opposing pairs of the bus bar supports 32 and 33 are secured to the housing by means of respective generally U-shaped brackets 34 which may be somewhat narrower than the width of the support 32. Each bracket 34 is provided with a bent-over tab 34a depending downwardly from a central portion of a lower leg portion 34c, which tab has a threaded opening and serves as a nut for one of the screws 27 securing the two combination side and bottom members 23 of the housing together. The extreme free end portion of each leg portion 34c is bent downwardly at a right angle to form a tab 34b having an opening threadedly receiving a screw 35 which secures the bracket 34 to one of the side wall portions 23a of the housing, the bight portion of each bracket 34 being juxtaposed against the other of the side wall portions 23a to add structural strength. If desired, the bight portion of each bracket 34 may be provided with a slot extending lengthwise of the bight portion which receives a complementary projection on its associated bus bar support 33 for limiting movement of the bus bar support 33 longitudinally of the bus duct housing. Opposing pairs of the bus bar supports 32 and 33 and their associated bracket 34 are alternately reversed as a unit with respect to the housing longitudinally of the housing.

An upper leg portion 34d of each bracket 34 serves as a support for an uninsulated ground bus bar 36. The ground bus bar 36 is of the same width as the power bus bars 30 but is thinner, its thickness being substantially one-fourth or one-half that of the power bus bars 30 so as to provide a ground bus bar of twenty-five percent or fifty percent of the cross-sectional area of the power bus bars 30. The ground bus bar 36 is supported in flatwise parallel-spaced relationship to the power bus bars 30, and its undersurface engages the leg portions 34d of the brackets 34 while its upper surface engages the inner surface of the generally flat main portion 25a of the top wall member 25, thus providing a good electrical connection of low impedance between the ground bus bar 36 and the housing.

The ground bus bar 36 is also held in position by a plurality of screws, such as the screw 37, spaced longitudinally of the section and threaded into openings in the main portion 25a of the top wall member 25. Each of the screws 37 also serves to secure a connector jaw 39, comprising two identical jaw members 38 reversed with respect to each other, in electrical connection with the undersurface of the ground bus bar 36. Each of the jaw members 38, shown best in FIG. 12, has an elongated slot 38a in a flat inner end portion to accommodate one of the screws 37, and a plurality of interlocking nub-like projections 38b and shallow recesses 38c formed as by punching and disposed adjacent the slot 38a to assist in preventing the two jaw members 38 from pivoting with respect to each other and with respect to the ground bus bar 36 about their associated screw 37. Each of the jaw members 38 has three of the projections 38b and a single recess 38c on an upper surface 38d, as viewed in FIG. 12, and complementary thereto, on a lower surface 38e, but not shown, three of the recesses 38c and a single projection 38b. It will be understood that the recesses 38c in the lower surface 38e are opposite the projections 38b on the upper surface 38d, respectively, and that the projection 38b on the lower surface 38e is opposite the single recess 38c in the surface 38d.

At longitudinally-spaced locations aligned with the openings for the screws 37, the ground bus bar 36 has narrow chamfered areas 36a in its lower edge portion, each for receiving an inner portion of a flared outer end portion of one of the two jaw members 38 of one of the connector jaws 39. Each connector jaw 39 extends outwardly from an edge of the ground bus bar 36 so that its flared outer end portion terminates substantially flush with the front face of the bus bar support 32 to receive a blade-type ground connector as will be described.

The bus duct section 20 has a plurality of recurring access openings 40 longitudially of the housing and alternately located in the opposite side wall portions 23a thereof, so as to be located adjacent the front face of the bus bar supports 32 of the opposing pairs of bus bar supports 32 and 33. Each of the access openings 40 is provided with a latched door 41 so that it may be covered when not in use. Each of the doors 41 is hinged to its respective side wall portion 23a by a pair of hinges 42 and is provided with a lanced portion 41a which interferes with the side wall portion 23a in the opening and closing of the door and thus maintains the door 41 in open position if desired.

Each access opening 40 exposes the front face of one of the insulating main bus bar supports 32, each support 32 being only slightly larger than the access opening 40 and provided with four openings 32b for receiving respective plug-in jaws of one of the plug-in units of the above-mentioned U.S. Patent 3,339,038, as will be described. The openings 32b communicate respectively with the notches 32a and expose the edge portion of a respective one of the power bus bars 30 with the insulation removed from the edge portion to permit the plug-in connection to be made to the bare surface of the power bus bar. Each bus bar support 32 also is provided with a notch 32c for receiving the flared outer end portion of one of the connector jaws 39. The front face of the bus bar support 32 may be provided with a plurality of grooves 32d as shown in FIG. 2 to provide additional creepage distance and to permit a saving in insulating material for more economical manufacture.

Referring now to FIG. 4, a duct plug or power tap-off plug-in unit 44, which may be generally of the type disclosed in the above-mentioned Patent No. 3,339,038 and to which reference may be made for a more detailed description, is shown in mounted relationship with the power bus bars 30 and the ground connector jaw 39 of the bus duct section 20, it being understood that the plug-in unit may be mounted in like manner on the bus duct section of an alternative embodiment as will be later described. The plug-in unit 44 has four plug-in connector jaws 45 arranged to extend, when the door 41 is set in its open position, through the respective openings 32b in one of the bus bar supports 32 to clamp on the exposed uninsulated edge portions of the respective power bus bars 30. In addition, the plug-in unit 44 has a blade-type ground connector 46 secured by one or more screws 46a to the case of the plug-in unit 44, the connector 46 and screws 46a comprising a ground connector kit for converting plug-in units such as disclosed in Patent No. 3,339,038 into plug-in units suitable for use with plug-in bus duct sections having or not having an internal ground bus bar. The ground connector 46 of the plug-in unit 44 extends into one of the notches 32c in one of the supports 32 to be received within the flared outer end portion of the two-piece connector jaw 39.

The plug-in unit 44 has a pair of hook members 47, one of which is shown secured respectively to an upper side wall portion 48 of the plug-in unit housing in any suitable manner, and a like hook member (not shown) located as disclosed in the above-mentioned Patent No. 3,339,038. The pair of hook members 47 fit respectively over one of the flanges 23c of the bus dust housing and each hook member 47 has a protruding finger portion 47a which is received within one of the notches in the flange 23c to mount the unit 44 to the bus duct 20 and to prevent movement of the unit 44 longitudinally of the housing. Means (not shown) at the bottom of the plug-in unit 44 cooperate with the bottom wall portions 23b of the housing to assist the hook members 47 in holding the unit 44 to the housing as disclosed in the above-mentioned Patent No. 3,339,038.

During mounting of the unit 44 on the bus duct section 20, the pair of hook members 47 so received within the notches in the flanges 23c provide a pivot axis for the unit 44 to swing the ground connector 46 and connector jaws 45 thereof into engagement, respectively, with the ground connector jaw 39 and the power bus bars 30 of the section 20. As shown in FIG. 4, the ground connector jaw 39 and the blade-type ground connector 46 are but a short distance from the pivot axis of the rotating plug-in unit 44, and in order to facilitate an easily-made ground connection, the ground connector jaw 39 is mounted on the bus duct section 20 rather than on the plug-in unit 44. The position of the ground connector jaw 39 and ground connector 46 close to the pivot axis also provides for their initial contact before contact of the connector jaws 45 with the power bus bars 30, thus to ensure that ground continuity is provided before any of the power connections are made.

The joint structure 22 is best shown in FIG. 6, in which a portion of the bus duct housing has been omitted for clarity. The joint structure 22 includes a bolt 50 threaded into an elongated flat nut 51 received in a correspondingly-shaped aperture located in the main portion 25a of the top wall member 25 of the housing and surrounded by upwardly bent portions of the wall member 25 about the opening. The nut 51 may be seen through its associated aperture in FIG. 1. The joint structure 22 may thus be tightened from the bottom of the bus duct section 20 merely by turning the bolt 50.

The bolt 50 is provided with an insulating sleeve 52 which extends from the head of the bolt substantially all the way to the nut 51. A metal sleeve-like spacer 54 and a spring washer 55 are positioned in that order along the bolt 50 inwardly of the head thereof and a second spring washer 55 is positioned on the bolt inwardly of the nut 51. A wave washer 56, best shown in FIG. 5, is provided on the bolt 50 inwardly of the second spring washer 55. The wave washer 56 is shaped in a series of crests and troughs to give the washer 56 an exaggerated thickness and has the capability to be flattened to some extent when the bolt 50 is tightened with respect to the nut 51.

The joint structure 22 is assembled with the power bus bars 30 and ground bus bars 36 of the bus duct section 20 at the factory and has spaces in which the bare end portions of four power bus bars 30a and a ground bus bar 36a of a like-connecting section of bus duct section may be interleaved. The insulation on the power bus bars 30, shown of exaggerated thickness in FIG. 6, is removed from the end portion of the bars within the joint structure 22, and the end portion of each power bus bar 30 is positioned between a pair of tie plates 57 carried by the joint structure 22 which serve to electrically connect them to a respective bus bar 30a of the other section. Five insulating plates positioned by the bolt 50 are disposed in alternately spaced relationship to the four power bus bars 30, three inner insulating plates 58 having identical opposite sides and two outer insulating plates 60, and upper and a lower one, having only their inner sides identical to the sides of the inner insulating plates 58. Each inner insulating plate 58 has a respective pair of the tie plates 57 partially received in recesses therein on opposite sides, and each outer insulating plate 60 has one of the tie plates 57 partially received within a recess therein on its inner side. Further, each inner insulating plate 58 is provided on each side with a pair of projecting concentric circular ribs including a larger outer rib 58a and a smaller inner rib (not shown), the inner rib defining a hole (not shown) through the insulating plate for receiving the bolt 50 and the sleeve 52. Each outer insulating plate 60 is provided only on its inner side with a pair of concentric circular ribs including a larger outer rib 60a and a smaller inner rib (not shown), the inner rib also defining a hole (not shown) through which the bolt 50 and the sleeve 52 are received. Each tie plate 57 is provided with a correspondingly aligned hole (not shown) for receiving the bolt 50, the sleeve 52, and the concentric circular ribs of the appropriate insulating plates 58 or 60.

The upper outer insulating plate 60 also carries on its upper surface a tie plate 62 similar to the tie plates 57. The plate 62 is partially received in a recess in the plate 60 and is in engagement with the end portion of the ground bus bar 36 for electrically connecting the ground bus bar 36 to the ground bus bar 36a in conjunction with the spring washer 55. The wave washer 56 maintains a space between the spring washer 55 and the tie plate 62 so that the end portion of the ground bus bar 36a may be received therebetween, and the five insulating plates maintain four spaces, respectively, so that the end portions of the respective power bus bars may be received therebetween, to permit interleaving of the second section of bus duct for serial connection to the bus duct section 20.

Referring now to FIGS. 7 through 11, an alternative embodiment of the invention is shown as a section of corrugated bus duct 70 of higher current capacity and short circuit rating than the bus duct 20, and includes a joint structure at one of its ends to facilitate the serial connection of the section 70 with another like section. The housing of bus duct section 70 may conveniently be made wider than that of the section 20, and is of the type disclosed in the above-mentioned, Patent No. 3,384,855. A plurality of hood and door assemblies, such as the pair of assemblies 73 shown in FIG. 9, are secured to the bus duct housing at intervals on opposite sides thereof over plug-in openings adapted to receive plug-in terminal jaws of bus duct plug-in units as will be described.

As best shown in FIG. 9, the housing of the bus duct section 70 is formed of our pieces including a top wall member 75 and a bottom wall member 76, which may be identical with the top wall member 75 but reversed with respect thereto, and a pair of identical side wall portions 77 also reversed with respect to each other, only one complete side wall portion being shown in FIG. 9. The side wall members 77 are provided with inwardly-facing grooves opposing pairs of which are aligned and respectively grip opposite edge portions of a plurality of insulated power bus bars 78 of uniform cross-section, four being shown in the embodiment disclosed.

The top wall member 75 includes a main portion 75a extending horizontally in the normal position of use of the bus duct 70, a pair of flange portions 75b respectively extending substantially at forty-five degree angles from opposite edge portions of the main portion 75a, and a pair of inwardly-turned edge portions 75c respectively extending from the flange portions 75b substantially parallel to the main portion 75a. The bottom wall member 76 includes a main portion 76a, a pair of flange portions 76b, and a pair of edge portions 76c corresponding respectively to the main portion 75a, flange portions 75b, and edge portions 75c of the top wall member 75.

Each side wall member 77 includes a corrugated main portion 77a, which supports the power bus bars 78 as just described, a pair of flange portions 77b respectively extending parallel to and engaging respective ones of the flange portions 75b and 76b, and a pair of edge portions 77c and 77d respectviely extending parallel to and overlying respective ones of the edge portions 75c and 76c. Each of the edge portions 77c is provided with a plurality of notches 79 at intervals, as shown in FIG. 7, for positioning plug-in units 44 longitudinally of the bus duct 70 in the manner described for the bus duct section 20, and each of the hood and door assemblies 73 is disposed over a plug-in opening in one of the side wall members 77. As can be seen in FIG. 9, the corrugated main portions 77a of the side wall portions 77 are cut away to form the longitudinally recurring plug-in openings which are covered by the hood and door assemblies 73.

Each of the hood and door assemblies 73, best shown in FIG. 9, includes a hood member 73a having a generally rectangular opening, similar to the openings 40 in the bus duct section 20, which is normally closed by a door 73b hinged to the hood member 73a, the assemblies 73 being substantially identical to those disclosed in the above-mentioned Patent No. 3,384,855. Each hood member 73a includes a pair of upper and lower anchoring flange portions 73c and a pair of scalloped side flange portions 73d, the anchoring flange portions 73c extending generally parallel to the respective flange portions 77b of the associated side wall portion 77 when installed thereon, and the scalloped side flange portions 73d having edges shaped so as to conform with the corrugated main portions 77a and the flange portions 77b of the side wall portions 77.

The plug-in openings covered by the hood and door assemblies 73 are adapted to receive protective molded insulators 80. Each of the insulators 80 is provided with a plurality of inner recesses or notches 80a in which the insulated power bus bars 78 are respectively received, and with four apertures 80b opening at the outer face of the insulator 80 (only two apertures being shown in FIG. 9), communicating respectively with the notches 80a and adapted to receive the plug-in terminal jaws 45 of the plug-in units 44. Each of the insulators 80 also includes a notch 80c opening from the outer face of the insulator, the outer face of the insulator 80 being mounted adjacent to the longitudinally recurring plug-in openings and exposed when the door 73b is in an open position. The insulators 80 are only slightly larger than the area exposed by the open door 73b.

The side wall members 77 are secured to the respective flange portions 75b and 76b of the top and bottom wall members 75 and 76 by a plurality of longitudinally-spaced screws 82 which, when spaced along the housing between the recurring hood and door assemblies 73, are threaded into openings in the respective flange portions 75b and 76b and, at the locations of the hood and door assemblies 73, are also threaded into the anchoring flange portions 73c of the assemblies 73 to clamp them against the respective flange portions 77b as shown in FIG. 9.

The insulators 80 also serve to support a ground bus bar 83. It is desirable, as in the case of the ground bus bar 36, to have the ground bus bar 83 provide a ground path of twenty-five percent or fifty percent conductivity to that of the power bus bars 78, and this is accomplished by reducing the thickness of the ground bus bar and initially retaining the width equal to that of the power bus bars 78. Then, in order to reduce the width of the ground bus bar 83 so that it can fit within the housing of the bus duct section 70, a folded longitudinal U-shaped channel or rib portion 83a is provided along the longitudinal mid-portion thereof.

The ground bus bar 83 is disposed in flatwise parallel-spaced relationship to the power bus bars 78. The under surfaces of the longitudinal edge portions of the ground bus bar 83 are engaged by the longitudinally-spaced insulators 80, and the upper surface of the ground bus bar 83 engages the inner surface of the generally flat main portion 75a of the top wall member 75. Thus, a good electrical connection of low impedance exists between the ground bus bar 83 and the housing. An additional support for the ground bus bar 83 is provided by screws 84 which further secure in position the ground bus bar 83 and are threaded into the main portion 75a of the top wall member 75. Each single screw 84 also serves to mount the two-piece ground connector jaw 39, used in the previously described embodiment of bus duct 20, in electrical connection with the under surface of the ground bus bar 83.

During the mounting of the plug-in unit 44 on the bus duct section 70, the pair of hook members 47 are received within the notches 79 in the flanges 77c to provide a pivot axis for the unit 44 to swing the ground connector 46 and the connector jaws 45 thereof into engagement, respectively, with the ground connector jaw 39 and the power bus bars 78 of the section 70, in the same manner as previously described for section 20.

A pair of slotted upper and lower inner joint covers 86 and 87, shown in FIG. 10, are secured respectively to the top wall member 75 and the bottom wall member 76 adjacent the left-hand end of the bus duct section 70 by respective pairs of screws 88. A pair of upper and lower outer joint covers 91 and 92 carrying a captive nut 93 and a bolt 94, respectively, are secured respectively to the top wall portion 75 and the bottom wall portion 76 adjacent the right-hand end of the bus duct section 70, as viewed in FIG. 7, by respective pairs of screws 95. The opposite end portions of the four power bus bars 78 are shaped to provide a joint structure 90 similar to that disclosed in U.S. Patent No. 3,187,086, issued June 1, 1965.

The joint structure 90 is enclosed at the top and bottom by the overlapping inner and outer joint covers 86 and 91 and 87 and 92, the outer joint covers 91 and 92 overlapping the inner joint covers 86 and 87, respectively. The ground bus bar 83 is offset at both its end portions with the right-hand end portion of the ground bus bar, as viewed in FIG. 7, containing a circular opening (not shown) to receive the bolt 94. The upper and lower outer joint covers 91 and 92, the right-hand end portions of the power bus bars 78, and a plurality of captured insulating plates 96a are similarly provided with circular openings (not shown) aligned with the circular opening in the right-hand end portion of the ground bus bar 83 to receive the bolt 94.

As shown in FIG. 8, the right-hand end portion of the ground bus bar 83 is secured to the inner surface of the upper outer joint cover 91 by means of a rivet 97, and the left-hand end portion of the ground bus bar 83 is secured to the inner surface of the upper inner joint cover 86 by means of another rivet 97. The left-hand end portion of the ground bus bar 83 is slotted, as shown in FIG. 11, in the offset area of the end portion which extends into the joint 90 so as to receive the bolt 94 within the slotted area. The upper and lower inner joint covers 86 and 87, the left-hand end portion of the power bus bars 78, and captured insulating plates 96b and 96c are similarly slotted (not shown) to receive the bolt 94 internally of the slotted area. The U-shaped channel portion 83a is terminated prior to the offset area at both of its end portions as shown at 83b in FIG. 11.

The upper outer joint cover 91 is offset inwardly on its extreme outer end portion an amount equal to the thickness of the ground bus bar 83 and then offset outwardly an equal amount, at 98, to thus provide a lip-like surface which is contiguous to and engages the upper surface of the upper inner joint cover 86 when the joint 90 is complete. The lower outer joint cover 92 is outwardly tapered at its extreme outer end portion, at 99, to provide easy telescoping for the lower inner joint cover 87 within the lower outer joint cover 92.

We claim:

1. A plug-in bus duct section comprising an elongated housing including a first wall and a second wall, said first wall having a generally flat contact surface along its inner surface, a plurality of generally flat power bus bars arranged in the housing in flatwise-stacked parallel spaced relationship to each other, a ground bus bar secured in electrically conductive relation to the contact surface of the first wall and spaced from the power bus bars, a joint structure at one end of the bus duct section, the power bus bars extending into the joint structure for serial connection respectively to power bus bars of a like bus duct section, the ground bus bar extending into the joint structure for serial connection to the ground bus bar of a like bus duct section, a plurality of longitudinally-spaced plug-in openings in the second wall of the housing providing access for the making of tap-off connections to the power bus bars and the ground bus bar, and ground connector means electrically connected to the ground bus bar at each of said openings for facilitating the making of said tap-off connections to the ground bus bar.

2. A plug-in bus duct section as claimed in claim 1 wherein the first wall is a top wall, the second wall is a side wall, the power bus bars are arranged in the housing in flatwise-stacked parallel-spaced relationship to the contact surface of the top wall, and the ground bus is arranged in flatwise parallel-spaced relationship to the power bus bars whereby the ground bus bar is positioned between an uppermost one of the power bus bars and said contact surface.

3. A plug-in bus duct section as claimed in claim 1 wherein the transverse cross-sectional area of each power bus bar is an integral multiple of the transverse cross-sectional area of the ground bus bar.

4. A plug-in bus duct section as claimed in claim 1 wherein a power tap-off plug-in unit is provided for electrical connection selectively through any one of the plug-in openings, said plug-in unit includes power connector means, ground connector means, and mounting means, said mounting means being operable for mounting the plug-in unit on the housing of the bus duct section, the power bus bars are insulated over most of their external surface and have respective uninsulated power contact areas exposed at each of the plug-in openings, the power contact areas at each opening being provided for electrical connection, respectively, with the power connector means of the plug-in unit, and the ground bus bar is uninsulated and the ground connector means thereof defines an exposed ground contact area at each of the plug-in openings, each ground contact area being provided for electrical connection with the ground connector means of the plug-in unit.

5. A plug-in bus duct section as claimed in claim 4 wherein the power connector means comprises a plurality of power connector jaws arranged to receive the exposed power contact areas of the power bus bars, respectively, the ground connector means on the plug-in unit includes a blade-type connector, the ground connector means of the ground bus bar comprises a ground connector jaw defining said ground contact area, said ground connector jaw being arranged to receive the blade-type ground connector of the plug-in unit.

6. A plug-in bus duct section as claimed in claim 5 wherein each of the ground connector jaws is secured to the ground bus bar by a single bolt and comprises two flatwise-stacked identical jaw members reversed with respect to each other, each of the jaw members is provided at its inner end portion with an opening extending from one side to the other for passage of the bolt, and a plurality of complementary nub-like projections and shallow recesses are provided on said sides of each jaw member, respectively, for interlocking the jaw members with each other and with the ground bus bar to assist in preventing said jaw members from privoting with respect to each other and with respect to the ground bus bar.

7. A plug-in bus duct section as claimed in claim 6 wherein said bolt also secures the ground bus bar to the generally flat contact surface of the first wall at each of the plug-in openings.

8. A plug-in bus duct section as claimed in claim 4 wherein the first wall of the housing is a top wall, the second wall of the housing is a side wall, the power bus bars are arranged in the housing in flatwise-stacked parallel-spaced relationship to the contact surface of the top wall, and the ground bus is arranged in flatwise parallel-spaced relationship to the power bus bars whereby the ground bus bar is positioned between an uppermost one of the power bus bars and said contact surface, said housing includes a third wall which is a side wall opposite said second wall, a plurality of the longitudinally-spaced plug-in openings are provided in the third wall, the insulated power bus bars have respective uninsulated power contact areas exposed at each of the plug-in openings in the third wall, and connector means of the ground bus bar defines an exposed ground contact area at each of the plug-in openings in the third wall.

9. A plug-in bus duct section as claimed in claim 5 wherein the blade-type connector and a fastening means comprise a ground connector kit for converting a plug-in unit without a ground connector means to a plug-in unit with a ground connector means.

10. A plug-in bus duct section as claimed in claim 1 wherein the power bus bars and the ground bus bar are of equal width.

11. A plug-in bus duct section as claimed in claim 10 wherein the housing is of rectangular cross-section with two additional walls, said first wall is a top wall and the second and the two additional walls are defined by a pair of identical combination side and bottom wall members.

12. A plug-in bus duct section as claimed in claim 11 wherein the transverse cross-sectional area of each power bus bar is an integral multiple of the transverse cross sectional area of the ground bus bar.

13. A plug-in bus duct section as claimed in claim 2 wherein the joint structure has an upper and a lower end portion and includes a fastening means, a plurality of insulating means, a plurality of pairs of metal connecting means, yieldable spacer means, end portions of the power bus bars, and an end portion of the ground bus bar, said upper end portion is positioned adjacent the top wall, some of said insulating means are positioned interspersedly between the respective end portions of the power bus bars, one of said insulating means is disposed between a lower surface of the end portion of a lowermost one of the power bus bars and the lower end portion of the joint structure, and another of said insulating means is disposed between the end portion of the uppermost one of the power bus bars and the end portion of the ground bus bar, some of the pairs of the connecting means are disposed on opposite sides of the respective power bus bars and in electrical connection therewith between the opposite sides of the power bus bars and said interspersed insulating means, one of the pairs of the connecting means is disposed on the opposite sides of the ground bus bar and in electrical connection therewith, one connecting means of said one pair of connecting means being disposed on one side of the ground bus bar and positioned between the one side of the ground bus bar and said another of the insulating means, said yieldable spacer means is disposed between said one pair of metal connecting means, and said fastening means extend between the upper and lower end portions of the joint structure in parallel-spaced relation to the side wall, and secure the parts of the joint structure in their assembled relation.

14. A plug-in bus duct section as claimed in claim 13 wherein said plurality of insulating means are plates formed of insulating material and have respective openings therethrough, said some pairs of connecting means are tie plates, and said one connecting means of said one pair of connecting means is a tie plate and the other connecting means of said pair is an annular washer, the tie plates and the washer having respective openings therethrough which are in alignment with the respective openings in the insulating plates, said yieldable spacer means includes an opening therethrough which is in alignment with the respective openings in the insulating plates, the tie plates, and the opening in the annular washer, said fastening means includes an insulated bolt and a nut, which nut is at the upper portion of the joint structure above the annular washer, said insulated bolt passes through the respective aligned openings in the insulating plates, the metal tie plates, the annular washer, and the yieldable spacer means into threaded connection with said nut for providing a means for tightening the joint structure by relative turning of the bolt and nut.

15. A plug-in bus duct section as claimed in claim 14 wherein the yieldable spacer means is positioned adjacent the upper end portion of the joint structure, the tie plate and the annular washer of said one pair of metal connecting means are respectively positioned on the opposite sides of the spacer means, said one tie plate and said annular washer have respective first and second end portions, said first end portions extend beyond the spacer means in one direction with the respective inner surfaces thereof in electrical connection with the opposite sides of said end portion of the ground bus bar and have their second end portions extending beyond the spacer means in the opposite direction and in spaced-apart relation for providing a space between their respective inner surfaces to receive an end portion of the ground bus bar of the like bus duct section.

16. A plug-in bus duct section as claimed in claim 15 wherein said one direction is longitudinally inwardly of the bus duct section.

17. A plug-in bus duct section as claimed in claim 15 wherein the annular washer is a spring-type washer.

18. A plug-in bus duct section as claimed in claim 14 wherein said end portions of the power bus bars and the end portion of the ground bus bar are uninsulated and terminate inwardly of the duct section from said insulated bolt.

19. A plug-in bus duct section as claimed in claim 14 wherein said tie plates are partially secured respectively within recesses in the sides of the insulating plates.

20. A plug-in bus duct section as claimed in claim 15 wherein said end portion of the ground bus bar and the space for reception of the end portion of the ground bus bar of the like bus duct section are coplanar.

21. A plug-in bus duct section as claimed in claim 15 wherein the yieldable spacer means is a wave washer having a plurality of crests and troughs permitting a compression of the wave washer during tightening of the joint structure by said relative turning of said insulated bolt and nut.

22. A plug-in bus duction section as claimed in claim 3 wherein the ground bus bar is generally flat except for a centrally-disposed longitudinal rib extending inwardly from the first wall of the housing.

23. A plug-in bus duct section as claimed in claim 22 wherein the housing is of rectangular cross-section, said first wall is a top wall and said second wall is a side wall, another side wall and a bottom wall are provided, each of the side walls having a plurality of inwardly-facing longitudinal grooves defining aligned pairs of oppositely disposed grooves, the plurality of power bus bars are of equal width and are arranged in the housing with the opposite longitudinal edge portions of each supported respectively in two of the oppositely disposed grooves, and the ground bus bar is of lesser width than the power bus bars.

24. A plug-in bus duct as claimed in claim 22 wherein the ground bus bar has a first offset end portion extending into the joint structure and a second offset end portion at the opposite end of the bus duct section from the first offset portion for reception in the joint structure of a like connecting bus duct section, and the U-shaped channel portion extends along the longitudinal axis of the ground bus bar between the first and second offset end portions.

25. A plug-in bus duct section as claimed in claim 24 wherein the first offset end portion has an opening for receiving an insulated bolt, the second offset end portion has an open-ended slot extending longitudinally of the ground bus bar, and the U-shaped channel portion of the ground bus bar terminates at its ends inwardly of said first and second offset end portions, respectively.

26. A plug-in bus duct section comprising a multiple-piece housing of rectangular cross-section having a top wall portion, a plurality of generally flat elongated power bus bars of equal width and cross-section arranged in flatwise parallel-spaced relationship to each other and to said top wall portion, a generally flat elongated ground bus bar arranged in flatwise parallel-spaced relationship to said power bus bars and in engagement with the top wall portion, said ground bus bar having a plurality of longitudinally-spaced connector jaws mounted thereon, said connector jaws each being held in position by a bolt that also secures the ground bus bar to the top wall portion, and a joint structure at one end of the section including end portions of the power bus bars and the ground bus bar for facilitating the electrical connection of the bus bars of the section respectively to bus bars of a duct section of like construction.

References Cited

UNITED STATES PATENTS 3,334,325   8/1967   Conrad et al. _____ 339—14
3,446,911   5/1969   Jorgensen _____ 174—88

MARVIN A. CHAMPION, Primary Examiner

P. A. CLIFFORD, Assistant Examiner

U.S. Cl. X.R.

174—99; 339—22